US012687274B1

(12) United States Patent
Lee

(10) Patent No.: US 12,687,274 B1
(45) Date of Patent: Jul. 21, 2026

(54) LAMP FOR VEHICLE

(71) Applicant: HYUNDAI MOBIS CO., LTD., Seoul (KR)

(72) Inventor: Hyun Soo Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 19/220,823

(22) Filed: May 28, 2025

(30) Foreign Application Priority Data

Jan. 20, 2025 (KR) ........................ 10-2025-0008245

(51) Int. Cl.
*F21S 43/20* (2018.01)

(52) U.S. Cl.
CPC ............................... *F21S 43/26271* (2024.05)

(58) Field of Classification Search
CPC ... F21S 43/26271; G02B 5/0231; F21V 5/007
See application file for complete search history.

(56) References Cited

U.S. PATENT DOCUMENTS 11,280,463 B2 3/2022 Moser et al.
11,668,447 B2 * 6/2023 Lee ......................... F21V 5/008 362/521
2019/0011102 A1 1/2019 Gehb et al.
2019/0186706 A1 * 6/2019 Kim ...................... F21S 41/285
2020/0217475 A1 7/2020 Kim et al.
2020/0386382 A1 12/2020 Choi et al.
2021/0381673 A1 * 12/2021 Lee ......................... F21S 43/15
2022/0205608 A1 * 6/2022 Go .......................... F21S 41/29
2023/0166654 A1 * 6/2023 Lee ....................... F21S 41/141
2023/0358388 A1 11/2023 Kang et al.
2025/0060081 A1 * 2/2025 Jin ........................ F21S 41/151

FOREIGN PATENT DOCUMENTS

DE 10 2020 129 081 A1 12/2021
WO WO-2024181838 A1 * 9/2024 ............ F21S 41/265

OTHER PUBLICATIONS

Extended European Search Report issued in corresponding European Patent Application 25179259.4 dated Oct. 10, 2025.

* cited by examiner

*Primary Examiner* — Erin Kryukova
(74) *Attorney, Agent, or Firm* — MORGAN, LEWIS & BOCKIUS LLP

(57) ABSTRACT

Disclosed is a lamp for a vehicle. The lamp for a vehicle includes a light source that generates and outputs light, and an MLA module provided on a front side of the light source, and to which the light is input. The MLA module includes an input lens array, to which the light is input, and including a plurality of input lenses, and an output lens array provided on a front side of the input lens array, that receives the light input to the input lens array and outputs the light to an outside, and including a plurality of output lenses, the plurality of output lenses correspond to at least some of the input lenses, respectively.

18 Claims, 11 Drawing Sheets

LAMP FOR VEHICLE

CROSS-REFERENCE TO RELATED APPLICATION

This application claims the benefit of priority to Korean Patent Application No. 10-2025-0008245, filed in the Korean Intellectual Property Office on Jan. 20, 2025, the entire contents of which are incorporated herein by reference.

TECHNICAL FIELD

The present disclosure relates to a lamp for a vehicle.

BACKGROUND

In a micro lens array (MLA), an image is projected by arranging a plurality of micro lenses. The micro lens array is widely used in various fields because it shows an image of an excellent quality with a small size.

In particular, in recent years, the micro lens array is used as a component that performs signal lighting functions (a welcome light function, a turn indicator, and the like) in a vehicle due to a feature of being able to draw a specific pattern on a road through an optical system having a size of around 10 mm.

However, according to the conventional technology, because a diffusion angle of light is as small as around 15 degrees in the micro lens array, other light functions (e.g., a low beam function), except for the welcome light function, cannot be performed in the vehicle, and thus, the micro lens array is restrictively used in the vehicle.

SUMMARY

The present disclosure has been made to solve the above-mentioned problems occurring in the prior art while advantages achieved by the prior art are maintained intact.

An aspect of the present disclosure provides a lamp for a vehicle, by which a lamp that performs various functions, such as a low beam, may be implemented by expanding a diffusion angle of light that is output from an MLA module.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a lamp for a vehicle may include a light source that generates and outputs light, and an MLA module provided on a front side of the light source, and to which the light is input, the MLA module may include an input lens array, to which the light is input, and including a plurality of input lenses, and an output lens array provided on a front side of the input lens array, that receives the light input to the input lens array and outputs the light to an outside, and including a plurality of output lenses, the plurality of output lenses may correspond to at least some of the input lenses, respectively, and when a distance between an optical axis of any one of the plurality of input lenses and an optical axis of any one of the plurality of output lenses, which corresponds to the any one input lens, in a leftward/rightward direction of the MLA module is defined as an inter-optical axis distance, the inter-optical axis distance may gradually increase as it goes from a central portion to a peripheral portion of the MLA module.

The plurality of input lenses may be formed in different shapes.

Each of the plurality of input lenses may have a radius of curvature in a horizontal direction and a radius of curvature in a vertical direction, which are different from each other.

With respect to a horizontal direction, a radius of curvature of an input lens disposed on an outermost side, among the plurality of input lenses, may be smaller than a radius of curvature of an input lens being adjacent thereto.

When the input lens array is viewed from a front side, an input lens disposed on an outermost side, among the plurality of input lenses, may be formed in a semicircular shape.

The input lens array may be divided into a first area, and a second area disposed at an upper end portion of the first area, with respect to a vertical direction, and a size of a plurality of input lenses disposed in the second area in a vertical direction may be formed to be greater than a size of a plurality of input lenses disposed in the first area in the vertical direction.

The number of the input lenses disposed in the first area may be greater than the number of the input lenses disposed in the second area.

The plurality of input lenses disposed in the second area may be provided in a plurality of rows, and the input lenses in the rows may be formed to have different sizes in the vertical direction.

The plurality of input lenses disposed in the second area may be provided in a plurality of rows, and the input lenses in the rows may be formed to have different radii of curvature in the vertical direction.

With respect to a vertical direction, an optical axis of any one of the plurality of input lenses may be formed at the same height of that of an optical axis of any one output lens corresponding to the any one input lens, among the output lenses.

Radii of curvature of the plurality of output lenses may be the same.

Each of the plurality of output lenses may have a radius of curvature in a horizontal direction and a radius of curvature in a vertical direction, which are the same.

The number of the input lenses may be greater than the number of the output lenses.

The input lens array may be divided into a central area, and outer areas disposed on ends of the central area in a leftward/rightward direction, with respect to a horizontal direction, and input lenses disposed in the central area may correspond to the output lenses, respectively.

The MLA module may further include a shield provided between the input lens array and the output lens array, and the shield is provided in a position corresponding to focuses of the plurality of output lenses provided in the output lens array. The MLA module may form a low beam pattern.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, an embodiment of the present disclosure will be described in detail with reference to the accompanying drawings.

First of all, embodiments described below are suitable for understanding technical characteristics of a lamp for a vehicle according to an embodiment of the present disclosure. However, the present disclosure is applied only to embodiments described below, or technical features of the present disclosure are not limited by the described embodiments. Various modified implementations are possible within the technical scope of the present disclosure.

Figure 1:
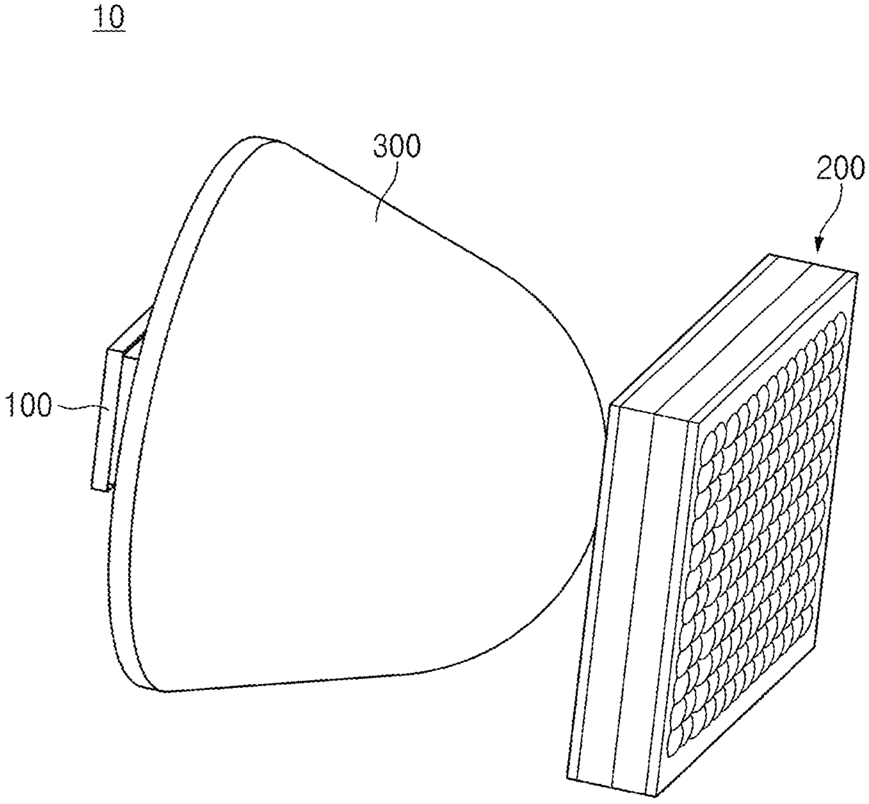
FIG. 1 is a perspective view schematically illustrating a lamp for a vehicle according to an embodiment of the present disclosure.
Figure 2:
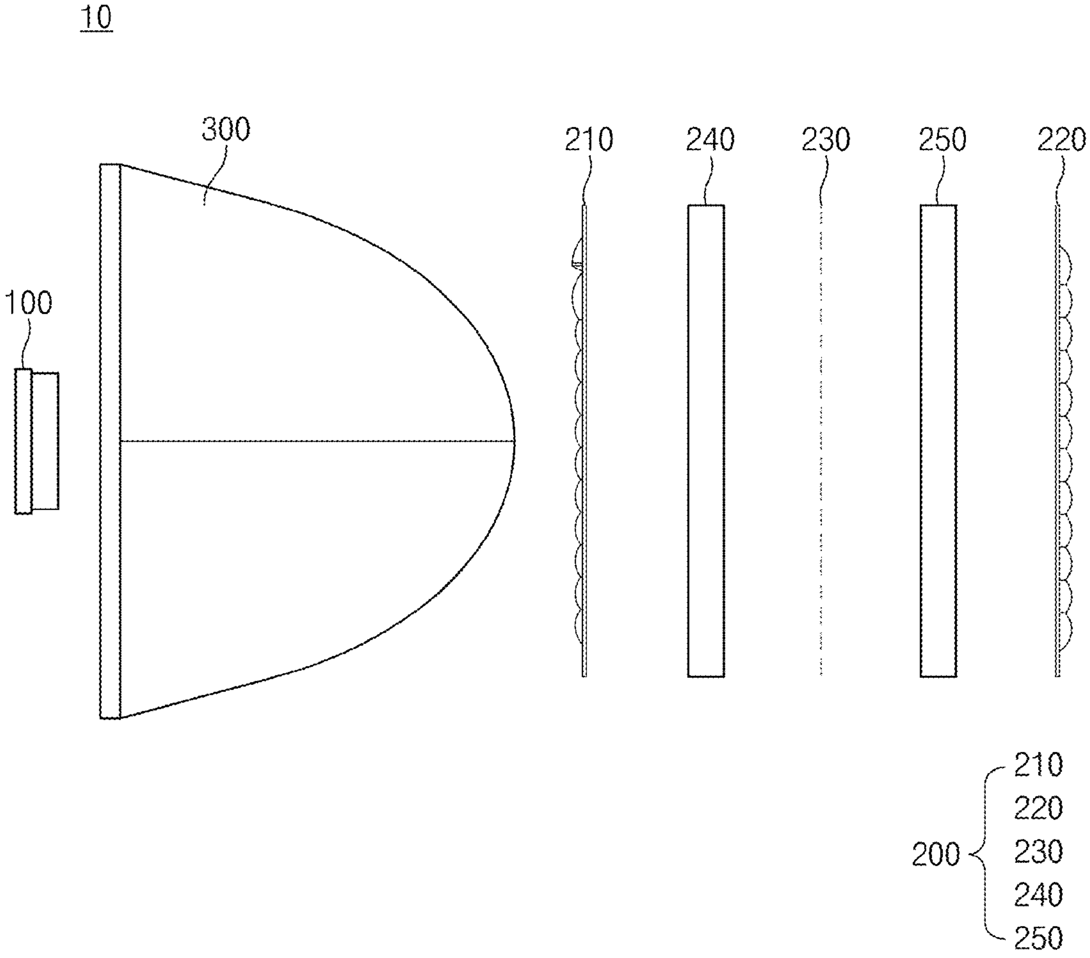
FIG. 2 is a side cross-sectional view illustrating a structure of a lamp for a vehicle according to an embodiment of the present disclosure.
Figure 3:
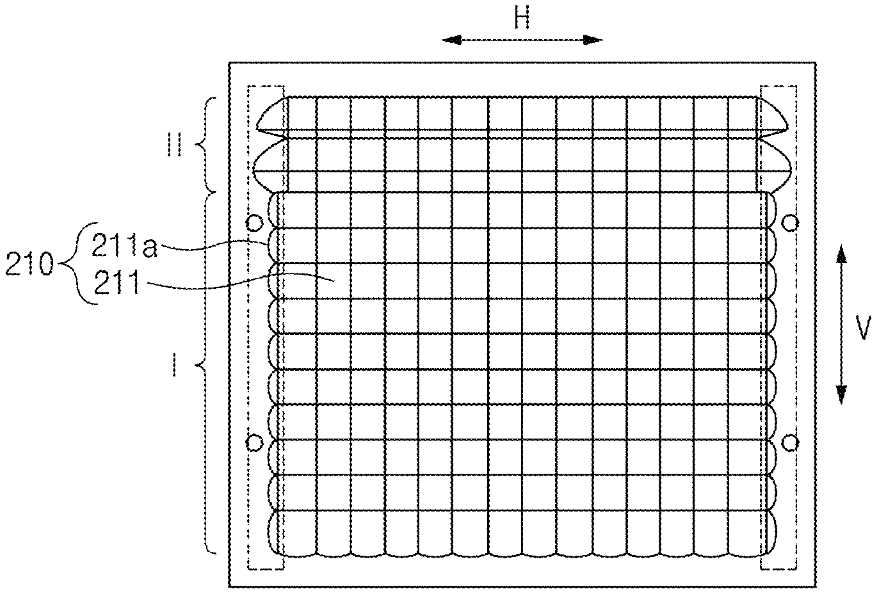
FIG. 3 is a front view of an input lens array according to an embodiment of the present disclosure, when viewed from a front side.
Figure 4:
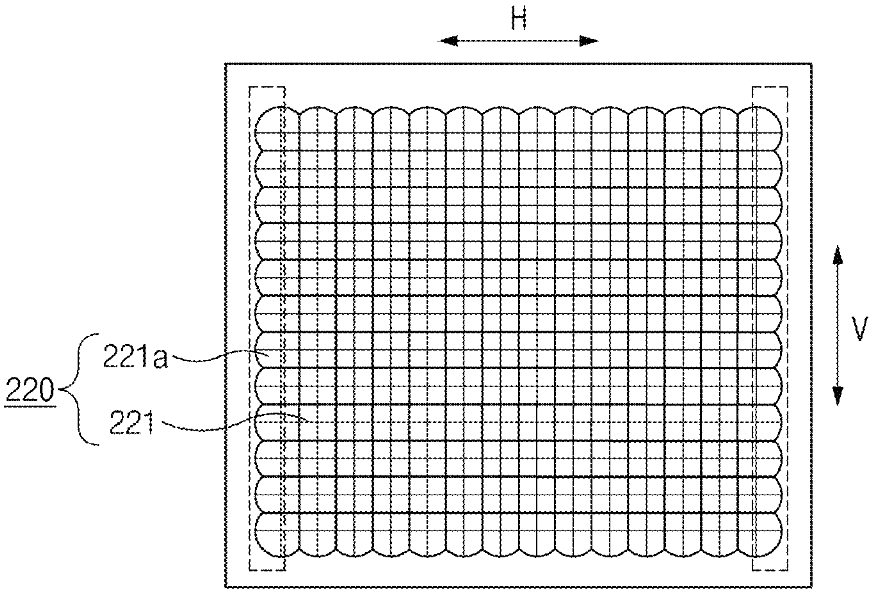
FIG. 4 is a front view of an output lens array according to an embodiment of the present disclosure, when viewed from a front side.
Figure 5:
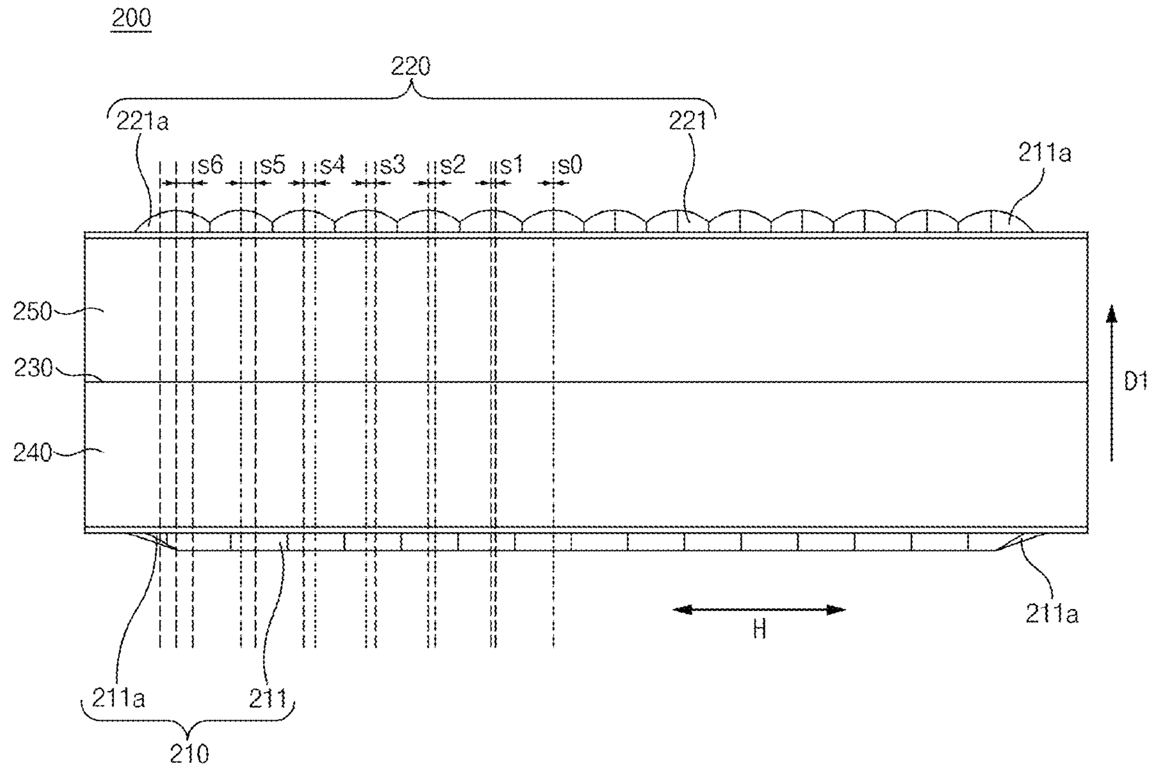
FIG. 5 is a top view of an MLA module according to an embodiment of the present disclosure, when viewed from a top.

FIG. 1 is a perspective view schematically illustrating a lamp for a vehicle according to an embodiment of the present disclosure, FIG. 2 is a side cross-sectional view illustrating a structure of a lamp for a vehicle according to an embodiment of the present disclosure, FIG. 3 is a front view of an input lens array according to an embodiment of the present disclosure, when viewed from a front side, FIG. 4 is a front view of an output lens array according to an embodiment of the present disclosure, when viewed from a front side, and FIG. 5 is a top view of an MLA module according to an embodiment of the present disclosure, when viewed from a top.

Figure 6:
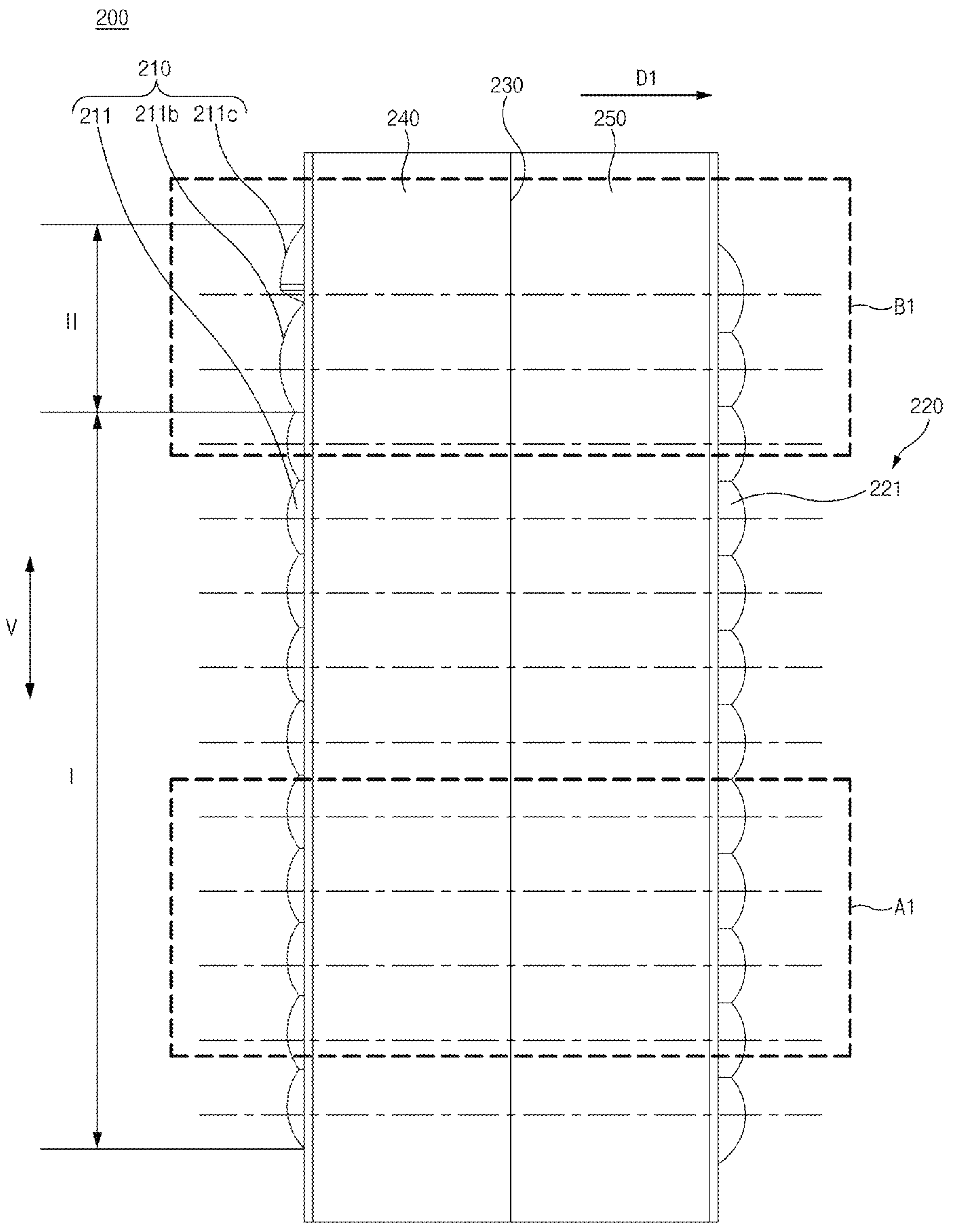
FIG. 6 is a side view of an MLA module according to an embodiment of the present disclosure, when viewed from a lateral side.
Figure 7:
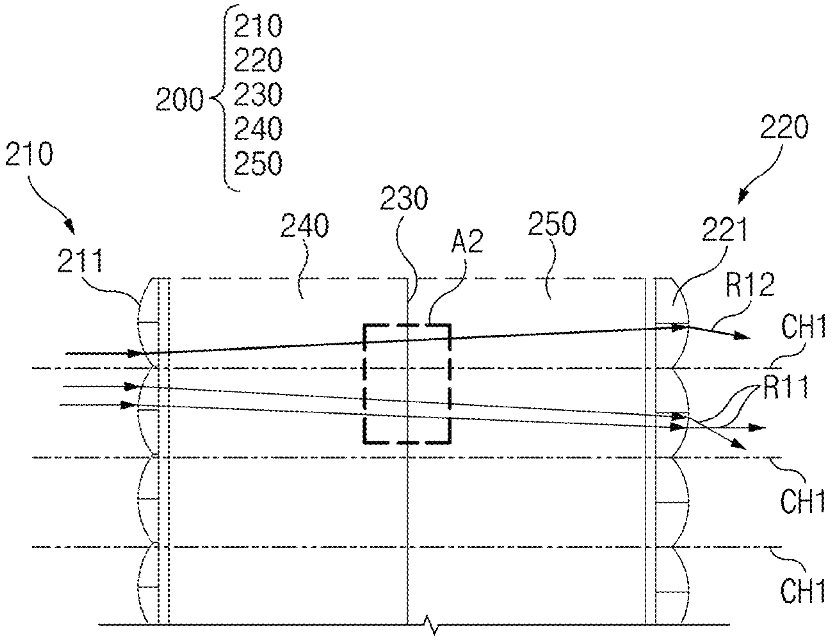
FIG. 7 illustrates an optical path of an MLA module according to an embodiment of the present disclosure, and is an enlarged side view of portion A1 of FIG. 6.
Figure 8:
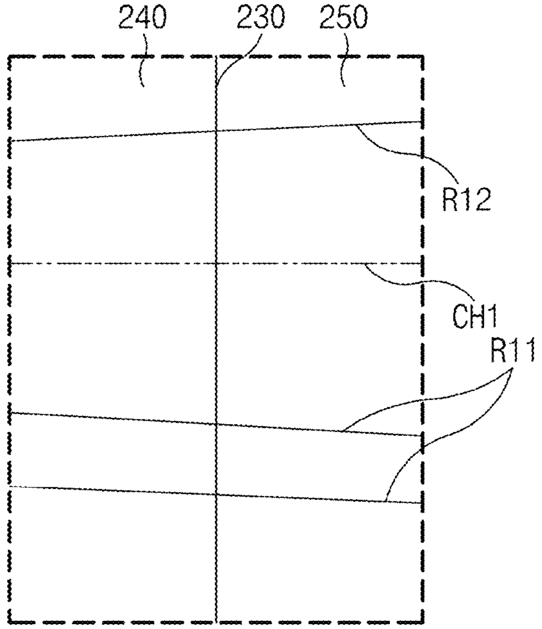
FIG. 8 illustrates an MLA module according to an embodiment of the present disclosure and is an enlarged side view of portion A2 of FIG. 7.
Figure 9:
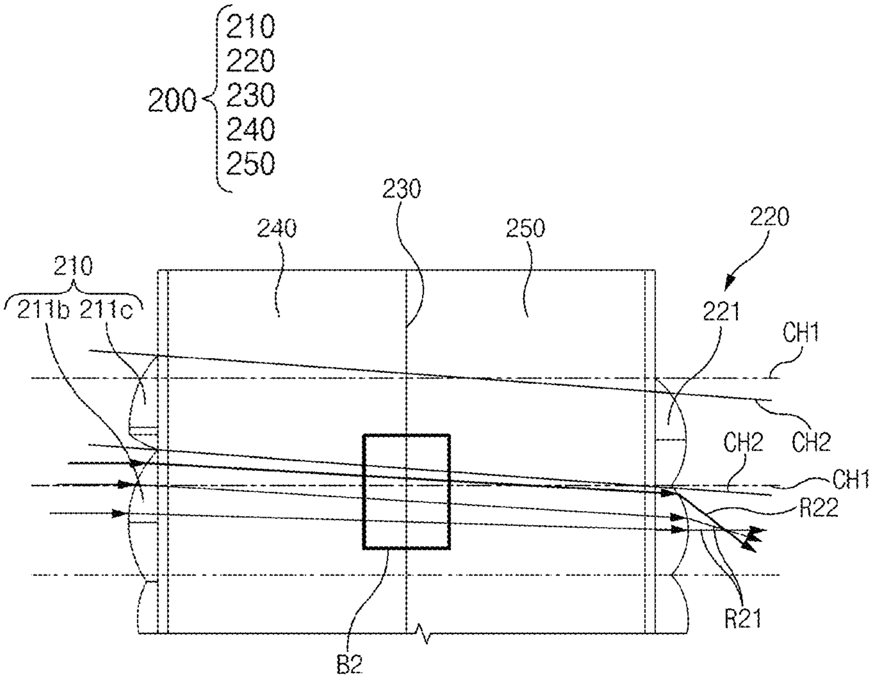
FIG. 9 illustrates an MLA module according to an embodiment of the present disclosure, and is an enlarged side view of portion B1 of FIG. 6.
Figure 10:
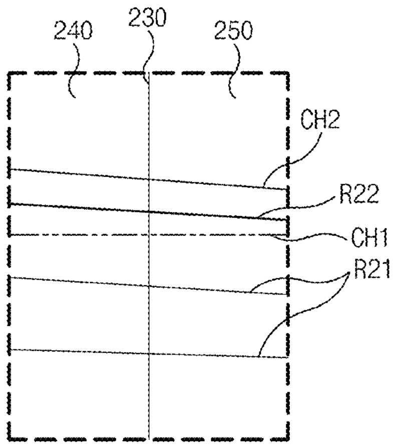
FIG. 10 illustrates an MLA module according to an embodiment of the present disclosure and is an enlarged side view of portion B2 of FIG. 9.
Figure 11:
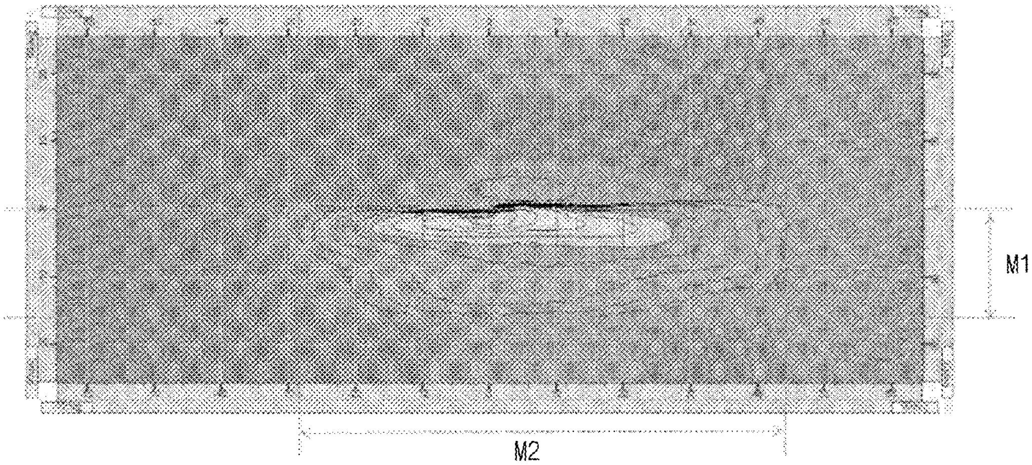
FIG. 11 is an image illustrating an example of a low beam pattern implemented by a lamp for a vehicle according to an embodiment of the present disclosure.

FIG. 6 is a side view of an MLA module according to an embodiment of the present disclosure, when viewed from a lateral side, FIG. 7 illustrates an optical path of an MLA module according to an embodiment of the present disclosure, and is an enlarged side view of portion A1 of FIG. 6, FIG. 8 illustrates an MLA module according to an embodiment of the present disclosure and is an enlarged side view of portion A2 of FIG. 7, FIG. 9 illustrates an MLA module according to an embodiment of the present disclosure, and is an enlarged side view of portion B1 of FIG. 6, FIG. 10 illustrates an MLA module according to an embodiment of the present disclosure and is an enlarged side view of portion B2 of FIG. 9, and FIG. 11 is an image illustrating an example of a low beam pattern implemented by a lamp for a vehicle according to an embodiment of the present disclosure.

Referring to FIGS. 1 to 11, a lamp for a vehicle 10 according to an embodiment of the present disclosure includes a light source 100 and a micro lens array (MLA) module 200.

The light source 100 is configured to generate and output light.

For example, the light source 100 may be configured to irradiate light in a direction that faces the MLA module 200. For example, the light source 100 may be a light emitting diode (LED), but the present disclosure is not limited thereto.

Furthermore, for example, the present disclosure may further include a collimator 300 that is provided between the light source 100 and the MLA module 200. The collimator 300 may be a configuration that makes light input from the light source 100 into parallel light and then emits the light to the MLA module 200.

The MLA module 200 is provided on a front side of the light source 100, and is configured such that light is input thereto. The module may include a plurality of micro lenses on an input surface and an output exit surface thereof.

The MLA module 200 includes an input lens array 210 and an output lens array 220.

Light is input to the input lens array 210, and the input lens array 210 includes a plurality of input lenses 211. Furthermore, the output lens array 220 is provided on a front side of the input lens array 210, receives the light input to the input lens array 210 to output it to the outside, and includes a plurality of output lenses 221.

Specifically, the MLA module 200 may include the input lens array 210 that is configured to face the collimator 300, and to which light is input, and the output lens array 220 that receives the light input to the input lens array 210 and outputs it to the outside.

The input lens array 210 may include a plurality of input lenses 211 that are micro lenses. As illustrated, the plurality of input lenses 211 may be convex lenses that protrude to be convex toward the light source 100.

Here, each of the plurality of input lenses may be formed to have a radius of curvature in a horizontal direction "H" and a radius of curvature in a vertical direction "V", which are different from each other. For example, the radius of curvature in the horizontal direction "H" of each of the plurality of input lenses may be smaller than the radius of curvature in the vertical direction "V". In other words, the curvature in the horizontal direction "H" may be greater than the curvature in the vertical direction "V". In this case, the light output from the light source 100 and input to the input lens array 210 may be diffused in the horizontal direction "H" while passing through the plurality of input lenses. Accordingly, according to the present disclosure, the diffusion of light (particularly, the diffusion of light in the horizontal direction "H") may occur significantly, compared to the conventional micro lens array.

Meanwhile, the plurality of output lenses 221 is configured to correspond to at least portions of the plurality of input lenses 211.

Furthermore, when a distance between an optical axis of any one of the plurality of input lenses 211 and an optical axis of any one of the plurality of output lenses 221, which corresponds to the any one input lens 211, in a leftward/rightward direction of the MLA module 200 is defined as an inter-optical axis distance, the inter-optical axis distance gradually increases as it goes from a central portion to a peripheral portion of the MLA module 200.

For example, referring to FIGS. 3 to 5, the input lens 211 and the output lens 221 may include a corresponding pair, sequentially toward a center in the leftward/rightward direction to the periphery of the MLA module 200. However, because the number of input lenses 211 and the number of output lenses 221 are not necessarily the same, the input lenses 211 and the output lenses 221 may not be in one-to-one correspondence. For example, when the number of input lenses 211 is greater than the number of output lenses 221, an outermost side input lens 211*a* with respect to the leftward/rightward direction may not have a corresponding output lens. However, the numbers and corresponding structures of the input lenses 211 and the output lenses 221 are not limited thereto.

For convenience of description, a distance between the optical axis of the input lens 211 and the optical axis of the output lens 221 that is disposed at a corresponding position to the input lens 211 will be defined as inter-optical axis distance. For example, when an example illustrated in FIG. 5 is described, an inter-optical axis distance between the input lens 211 and the output lens 221 disposed at a central portion of the MLA module 200 may be S0, and an inter-optical axis distance of the input lens 211 and the output lens 221 disposed at the periphery thereof may be S6. The inter-optical axis distances formed by the input lenses 211 and the output lenses 221 sequentially disposed from the center to the periphery may be defined as S1, S2, S3, S4, and S5.

In this case, the inter-optical axis distances may gradually increase in the order of S0, S1, S2, S3, S4, S5, and S6. In other words, the optical axes of the output lenses 221 and the optical axes of the corresponding input lenses 211 may be gradually more distant from each other as they go from the center to the periphery with respect to the leftward/rightward direction.

Here, S0 that is an inter-optical axis distance formed at the central portion may be 0. In this case, a position of the optical axis of the output lens 221 in the horizontal direction "H" and a position of the optical axis of the input lens 211 in the horizontal direction "H" may be the same.

When the position of the optical axis of the input lens in the horizontal direction "H" and the position of the optical axis of the output lens 221 are different, an amount of, among the lights that travel from the input lens 211, the light that reaches a periphery of the output lens 221 corresponding to the input lens 211 may become larger. In this case, a diffusion degree of the light may increase. That is, a diffusion angle of the light output from the output lens 221 may increase. Accordingly, the optical axis of the input lens 211 and the optical axis of the output lens 221 may be spaced apart from each other to increase a width of the light.

In this case, when the inter-optical axis distance gradually increases as it goes to the periphery of the MLA module 200, the diffusion angle of the light may increase for the output lens 221 disposed closer to the periphery of the output lens array 220 in the leftward/rightward direction. Accordingly, the diffusion angle of the light output from the MLA module 200 increases.

According to this structure, not only a lamp that performs a signal lighting function but also a lamp that performs various functions may be implemented through the MLA module 200 including a plurality of micro lenses. For example, the MLA module 200 according to the present disclosure may secure a minimum diffusion angle (about ±35 degrees or more) of a low beam, so that a low beam may be implemented by using a micro lens array.

As described above, the MLA module 200 according to the present disclosure may implement a lamp that performs various functions by expanding the diffusion angle of the output light as the inter-optical axis distance gradually increases as it goes from the central portion to the peripheral portion in the leftward/rightward direction.

More specifically, a low beam lamp may be implemented even when the output lens 221 unit is replaced with the MLA module 200 according to the present disclosure in the existing projection-type optical system.

Meanwhile, the plurality of input lenses 211 may be formed in different shapes.

Specifically, all or part of the plurality of input lenses 211 may be formed in different shapes. For example, radii of curvature of the plurality of input lenses 211 may be different. Accordingly, the diffusion degrees of the lights of the input lenses 211 may be different.

For example, referring to FIG. 5, with respect to the horizontal direction "H", the radius of curvature of the input lens 211*a* disposed on an outermost side, among the plurality of input lenses 211, may be smaller than a radius of curvature of the adjacent input lens 211. That is, the curvature of the input lens 211*a* disposed on the outermost side, among the plurality of input lenses 211, may be the greatest.

In this way, when the curvature of the input lens 211*a* disposed on the outermost side is large, the light that travels from the outermost input lens 211*a* toward the output lens 221 may be directed to the center of the output lens 221*a* disposed on the outermost side of the output lens array 220. In other words, the light input to the input lens 211*a* disposed on the outermost side may be concentrated at the center of the output lens 221*a* disposed on the outermost side.

Accordingly, an intensity of the light output from the MLA module 200 may increase. That is, when the MLA module 200 according to the present disclosure is used, the width and the intensity of the light may be simultaneously secured.

Furthermore, for example, when the input lens array 210 is viewed from the front side, among the plurality of input lenses 211, the input lens 211*a* disposed on the outermost side may be formed in a semicircular shape.

Specifically, as in the embodiment illustrated in FIG. 3, the input lens 211 disposed in a portion other than the outermost side may have a central portion that has a shape that is convex toward the light source 100 when viewed from the front side. On the other hand, the input lens 211*a* disposed on the outermost side may have a semicircular shape as viewed from the front side.

Accordingly, according to the present disclosure, most of the lights that reach the input lens 211 disposed on the outermost side of the input lens array 210 from the light source 100 may be concentrated on the output lens 221*a* disposed on the outermost side of the output lens array 220. Accordingly, an intensity of the light output from the MLA module 200 may increase further.

Furthermore, for example, the number of the input lenses 211 may be greater than the number of output lenses 221.

As described above, the curvatures of the plurality of input lenses 211 may be different. Furthermore, the radius of curvature of the input lens 211*a* disposed on the outermost side, among the plurality of input lenses 211, may be large, and when necessary to secure the intensity of the light, the radius of curvature may increase as it goes to the periphery in the leftward/rightward direction.

Accordingly, according to the present disclosure, a sufficient light intensity may be secured by forming the MLA module 200 such that the number of input lenses 211 is greater than the number of output lenses 221 with respect to the leftward/rightward direction. For example, in this case, each of the plurality of output lenses 221 may correspond to some of the plurality of input lenses 211.

More specifically, the input lens array 210 may be divided into a central area, and outer areas that are disposed at ends of the central area in the leftward/rightward direction with respect to the horizontal direction "H".

Furthermore, the plurality of input lenses 211 disposed in the central area may correspond to the plurality of output lenses 221, respectively.

Accordingly, as illustrated in the embodiment illustrated in FIG. 5, the input lens array 210 may further include an input lens 211 in the outer area compared to the output lens array 220.

Meanwhile, referring to FIGS. 3, 4, and 6 to 10, the input lens array 210 may be divided into a first area I, and a second area II that is disposed at an upper end portion of the first area I with respect to a vertical direction "V".

Furthermore, sizes of the plurality of input lenses 211*b* and 211*c* disposed in the second area II in the vertical direction "V" may be larger than sizes of the plurality of input lenses 211 disposed in the first area I in the vertical direction "V".

Specifically, the first area I and the second area II are areas that are obtained by dividing the area of the input lens array 210 with respect to the vertical direction "V". For example, as in the illustrated embodiment, most of input lenses 211 may be disposed in the first area I, and an upper end portion (e.g., the first row and the second row) may be the second area II. However, the second area II is not limited to the input lenses 211 disposed in the first row and the second row, but may be changed according to the design specifications of the lamp. For example, the second area II may include only the input lens 211 of the first row, or may include input lenses 211 of three or more rows.

Here, the sizes of the input lenses 211*b* and 211*c* disposed in the second area II in the vertical direction "V" may be larger than the sizes of the input lenses 211 disposed in the first area I in the vertical direction "V". As an example, the sizes of the input lenses 211 disposed in the first area I in the vertical direction "V" may be the same.

In this way, the sizes of the input lenses 211*b* and 211*c* disposed in the second area II located at the upper end portion may be formed to be larger than the size of the input lens 211 located thereunder, and thus, an entire area of the input lens array 210 may be expanded to an upper side. Accordingly, paths of the lights input to the input lenses 211*b* and 211*c* disposed in the second area II may be changed, and thus, short-range light in front of the vehicle may be secured.

Specifically, FIGS. 7 and 8 are enlarged views of area A1 illustrated in FIG. 6, and illustrates the path of the light input to the first area I of the input lens array 210. Furthermore, FIG. 8 is an enlarged view of area A2 of FIG. 7.

In FIGS. 6 to 8, CH1 denotes reference lines that divide the optical paths with respect to the plurality of output lenses 221. The optical paths of the lights form a plurality of independent channels by CH1. That is, in the optical channels, optical paths between the input lenses 211 and the output lenses 221 corresponding to each other are formed. When the MLA module 200 is designed, it may be designed such that interferences of lights between the independent optical channels are minimized.

R11 and R12 of FIGS. 7 and 8 denote rays that show the optical paths in adjacent optical channels. The lights input to the input lenses 211 form paths, in which they travel toward the centers of the output lenses 221 corresponding thereto.

Meanwhile, FIGS. 9 and 10 are enlarged views of area B1 illustrated in FIG. 6, and illustrates the path of the light input to the first area I of the input lens array 210. Furthermore, FIG. 10 is an enlarged view of area B2 of FIG. 9.

In FIGS. 6, 9, and 10, CH1 denotes reference lines that divide the optical paths with respect to the plurality of output lenses 221. Furthermore, CH2 denote reference lines for explaining the optical paths changed by the input lenses 211 of the second area II. Specifically, the optical channels formed by CH2 are formed by the optical paths changed by the input lenses 211 of the second area II. Furthermore, R21 and R22 denote rays that show the optical paths by the input lenses 211 of the second area II.

Referring to the illustrated drawings, because the sizes of the input lenses 211 of the second area II in the vertical direction "V" is formed to be larger than the sizes of the input lenses 211 of the first area I in the vertical direction, the lights input through the input lenses 211 of the second area II may form optical paths that are inclined downward compared to the first area I (see ray R22 of FIGS. 9 and 10).

Accordingly, the lights input through the input lenses 211 of the second area II may form optical paths, in which they are output to a short-distance area (an area around about −15 degrees with respect to the vertical direction "V") when they are output through the lamp for a vehicle 10. Accordingly, short-distance light may be secured. According to the configuration, when the lamp for a vehicle 10 according to the present disclosure performs a low beam lamp function, a distribution of light intensities that satisfy the law may be formed.

Meanwhile, referring to FIGS. 6 and 9, the plurality of input lenses 211*b* and 211*c* disposed in the second area II may be provided in a plurality of rows, and the input lenses 211*b* and 211*c* in the rows may have different sizes in the vertical direction "V".

As an example, the second area II may include two rows, and the sizes of the input lenses disposed in the first row (the uppermost row) in the vertical direction "V" may be smaller than the sizes of the input lenses 211*b* disposed in the second row. However, the input lenses 211*b* and 211*c* disposed in the second area II of the input lens array 210 according to an embodiment of the present disclosure are not limited to being disposed in two rows, and it is apparent that they may be disposed in one row or three or more rows.

Furthermore, the input lenses 211*b* and 211*c* disposed in the second area II of the input lens array 210 are not limited to the case, in which the sizes of the input lenses in the first row in the vertical direction "V" are smaller than those in the second row, and may be variously modified and carried out according to design specifications of the lamp.

Furthermore, for example, the plurality of input lenses 211 disposed in the second area II may be disposed in a plurality of rows, and the input lenses 211 in the rows may have different radii of curvature in the vertical direction "V".

Specifically, the input lenses 211 disposed in the first area I are provided in a plurality of rows, and the input lenses 211 in the plurality of rows disposed in the first area I have the same curvature in the vertical direction "V" to have a uniform shape. Meanwhile, the input lenses 211*b* and 211*c* disposed in the second area II are provided in a plurality of rows, but the input lenses 211 in the plurality of rows disposed in the first area I may have different radii of curvature in the vertical direction "V" to have uneven shapes.

However, the input lenses 211*b* and 211*c* disposed in the second area II of the input lens array 210 according to an embodiment of the present disclosure are not limited to the case, in which the sizes of the input lenses in the first row in the vertical direction "V" are smaller than those in the second row, and may be variously modified and carried out according to design specifications of the lamp.

Furthermore, for example, the number of the input lenses 211 disposed in the first area I may be greater than the number of the input lenses 211*b* and 211*c* disposed in the second area II. Specifically, as described above, most of the input lenses 211 provided in the input lens array 210 may be disposed in the first area I.

Meanwhile, referring to FIG. 6, with respect to the vertical direction "V", the optical axis of any one of the plurality of input lenses 211 may be formed at the same height as that of the optical axis of any one of the output lenses 221, which corresponds to the any one input lens 211.

Accordingly, the beam pattern formed by the lamp for a vehicle 10 according to the present disclosure may be formed to have a narrow width in the vertical direction "V". As described above, this is based on a principle that the width of the output light increases when the optical axis of the input lens 211 and the optical axis of the output lens 221 do not coincide with each other, and the width of the output light decreases when the optical axis of the input lens 211 and the optical axis of the output lens 221 coincide with each other.

The lamp according to the present disclosure may form a low beam pattern, and in this case, a width M1 of the low beam pattern in the vertical direction may be relatively narrower than a width M2 in the horizontal direction "H". Accordingly, because the optical axis of the input lens 211 and the optical axis of the output lens 221 corresponding to each other are formed at the same height, the light may be less diffused in the vertical direction "V", and thus, a narrow width of the low beam pattern in the vertical direction "V" may be implemented.

Meanwhile, the plurality of output lenses 221 provided in the output lens array 220 according to the present disclosure may include features that are different from those of the plurality of input lenses 211. The output lens 221 may be a convex lens that protrudes to be convex toward an output direction D1 that is opposite to the light source 100.

Furthermore, the radii of curvature of the plurality of output lenses 221 may be formed to be the same.

Furthermore, each of the plurality of output lenses 221 may have a radius of curvature in the horizontal direction "H" and a radius of curvature in the vertical direction "V" that are the same. Specifically, each of the plurality of output lenses 221 may be formed of a rotationally symmetric aspherical lens.

Accordingly, in the output lenses 221 provided in the output lens array 220, the curvatures of the outermost side output lens 221*a* and another output lens 221 may be the same within an error range with respect to the horizontal direction "H". Furthermore, for example, in the output lenses 221 provided in the output lens array 220, the size of the uppermost output lens 221 in the vertical direction "V" and the size of another output lens 221 in the vertical direction "V" may be the same within an error range.

Meanwhile, as illustrated in FIGS. 1 and 2, the MLA module 200 may include a shield 230 that is provided between the input lens array 210 and the output lens array 220 and is configured to shield a portion of the light. A plurality of slits may be formed in the shield 230 such that the light output from the input lens array 210 may be input to the output lens array 220. However, the shape of the shield is not limited thereto.

For example, the shield 230 may be provided in a position corresponding to a focus of the output lens 222 provided in the output lens array 220.

Meanwhile, the MLA module 200 may further include an input body part 240 that is provided between the input lens array 210 and the shield 230 and supports the input lens array 210, and an output body part 250 that is provided between the output lens array 220 and the shield 230 and supports the output lens array 220. However, unlike this, the MLA module 200 may not include the input body part 240 or the output body part 250.

Meanwhile, the lamp 10 according to the present disclosure may be a configuration for forming a low beam pattern of a vehicle.

According to an embodiment of the present disclosure, a lamp that performs various functions, such as a low beam, may be implemented by expanding the diffusion angle of the light output from the MLA module.

As described above, although specific embodiments of the present disclosure have been described above, the spirit and scope of the present disclosure is not limited to these specific examples. Various modifications and variations are possible within the scope that does not change the gist of the present disclosure described in claims by those skilled in the art to which the present disclosure belongs.

What is claimed is:

1. A lamp for a vehicle, comprising:

a light source configured to generate and output light; and a micro lens array (MLA) module provided on a front side of the light source, and to which the light is input, wherein the MLA module includes:

an input lens array, to which the light is input, and including a plurality of input lenses; and an output lens array provided on a front side of the input lens array, configured to receive the light input to the input lens array and output the light to an outside, and including a plurality of output lenses, wherein the plurality of output lenses correspond to at least some of the input lenses, respectively, and wherein the input lens array is divided into a first area, and a second area disposed at an upper end portion of the first area, with respect to a vertical direction, and wherein a size of a plurality of input lenses disposed in the second area in a vertical direction is formed to be greater than a size of a plurality of input lenses disposed in the first area in the vertical direction, wherein with respect to a horizontal direction, a radius of curvature of an input lens disposed on an outermost side, among the plurality of input lenses, is smaller than a radius of curvature of an input lens being adjacent thereto.

2. The lamp of claim 1, wherein the plurality of input lenses have different shapes.

3. The lamp of claim 1, wherein each of the plurality of input lenses has a radius of curvature in a horizontal direction and a radius of curvature in a vertical direction, which are different from each other.

4. The lamp of claim 1, wherein when the input lens array is viewed from a front side, an input lens disposed on an outermost side, among the plurality of input lenses, is formed in a semicircular shape.

5. The lamp of claim 1, wherein when a distance between an optical axis of any one of the plurality of input lenses and an optical axis of any one of the plurality of output lenses, which corresponds to the any one input lens, in a leftward/rightward direction of the MLA module is defined as an inter-optical axis distance, the inter-optical axis distance gradually increases as it goes from a central portion to a peripheral portion of the MLA module.

6. The lamp of claim 5, wherein a number of the input lenses disposed in the first area is greater than a number of the input lenses disposed in the second area.

7. The lamp of claim 5, wherein the plurality of input lenses disposed in the second area are provided in a plurality of rows, and wherein the input lenses in the rows are formed to have different sizes in the vertical direction.

8. The lamp of claim 5, wherein the plurality of input lenses disposed in the second area are provided in a plurality of rows, and wherein the input lenses in the rows are formed to have different radii of curvature in the vertical direction.

9. The lamp of claim 1, wherein with respect to a vertical direction, an optical axis of any one of the plurality of input lenses has the same height as a height of an optical axis of any one of the plurality of output lens corresponding to the any one input lens, among the plurality of output lenses.

10. The lamp of claim 1, wherein radii of curvature of the plurality of output lenses are the same.

11. The lamp of claim 1, wherein each of the plurality of output lenses has a radius of curvature in a horizontal direction and a radius of curvature in a vertical direction, which are the same.

12. The lamp of claim 1, wherein a number of the input lenses is greater than a number of the output lenses.

13. The lamp of claim 1, wherein the input lens array is divided into a central area, and outer areas disposed on ends of the central area in a leftward/rightward direction, with respect to a horizontal direction, and wherein input lenses disposed in the central area correspond to the output lenses, respectively.

14. The lamp of claim 1, wherein the MLA module further includes a shield provided between the input lens array and the output lens array, and wherein the shield is provided in a position corresponding to focuses of the plurality of output lenses provided in the output lens array.

15. The lamp of claim 1, wherein the MLA module is configured to form a low beam pattern.

16. A lamp for a vehicle, comprising:

a light source configured to generate and output light; and a micro lens array (MLA) module provided on a front side of the light source, and to which the light is input, wherein the MLA module includes:

an input lens array, to which the light is input, and including a plurality of input lenses; and an output lens array provided on a front side of the input lens array, configured to receive the light input to the input lens array and output the light to an outside, and including a plurality of output lenses, wherein the plurality of output lenses correspond to at least some of the input lenses, respectively, and wherein the input lens array is divided into a first area, and a second area disposed at an upper end portion of the first area, with respect to a vertical direction, wherein a size of a plurality of input lenses disposed in the second area in a vertical direction is formed to be greater than a size of a plurality of input lenses disposed in the first area in the vertical direction, wherein when a distance between an optical axis of any one of the plurality of input lenses and an optical axis of any one of the plurality of output lenses, which corresponds to the any one input lens, in a leftward/rightward direction of the MLA module is defined as an inter-optical axis distance, the inter-optical axis distance gradually increases as it goes from a central portion to a peripheral portion of the MLA module, wherein the plurality of input lenses disposed in the second area are provided in a plurality of rows, and wherein the input lenses in the rows are formed to have different radii of curvature in the vertical direction.

17. The lamp of claim 16, wherein the plurality of input lenses have different shapes.

18. The lamp of claim 16, wherein each of the plurality of input lenses has a radius of curvature in a horizontal direction and a radius of curvature in a vertical direction, which are different from each other.

* * * * *